United States Patent [19]

Fransworth

[11] Patent Number: 5,083,746
[45] Date of Patent: Jan. 28, 1992

[54] DIAPHRAGM VALVE WITH MECHANICALLY LINKED DIAPHRAGM

[75] Inventor: Vincent R. Fransworth, Agoura, Calif.

[73] Assignee: Porton Instruments, Inc., Tarzana, Calif.

[21] Appl. No.: 529,370

[22] Filed: May 29, 1990

[51] Int. Cl.⁵ .................. F16K 31/06; F16K 7/14
[52] U.S. Cl. .................. 251/129.17; 251/331
[58] Field of Search .................. 251/331, 129.17, 368

[56] References Cited

FOREIGN PATENT DOCUMENTS 2800251  9/1979  Fed. Rep. of Germany ...... 251/331
693845   7/1953  United Kingdom ................ 251/331

Primary Examiner—Arnold Rosenthal
Attorney, Agent, or Firm—Iver P. Cooper

[57] ABSTRACT

A chemically inert diaphragm valve is provided in which the diaphragm is attached to the plunger of a solenoid by a threaded insert. The diaphragm material, which is preferably a relatively flexible, chemically inert material such as Kalrez or Chem-Raz, is molded around one end of a machined piece with the other end of the piece being threaded. The threaded end may be received by the tapped end of a solenoid plunger. The piece contained within the diaphragm material acts to stabilize cold-flow at the valve site as well as perform the valving function.

7 Claims, 2 Drawing Sheets

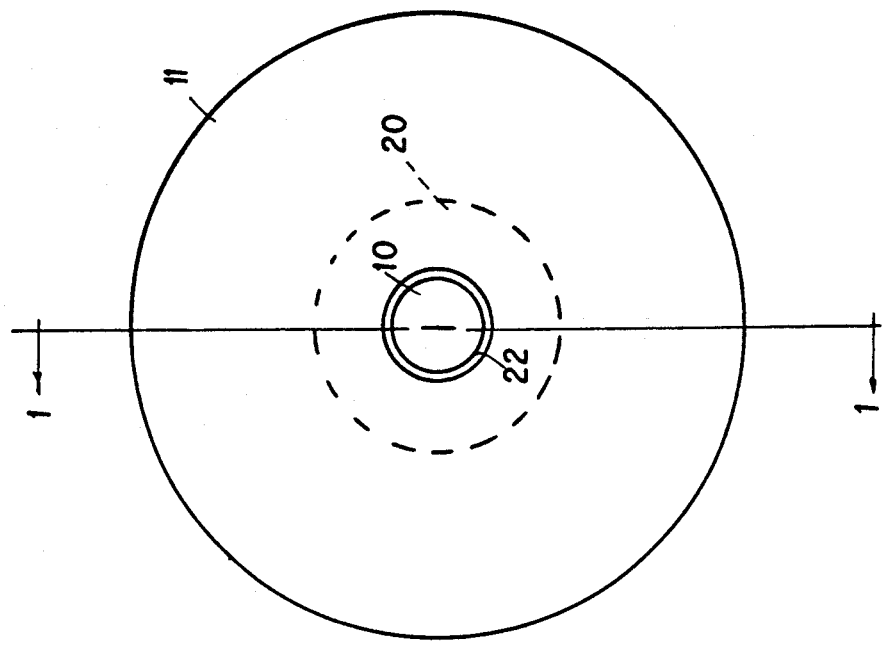
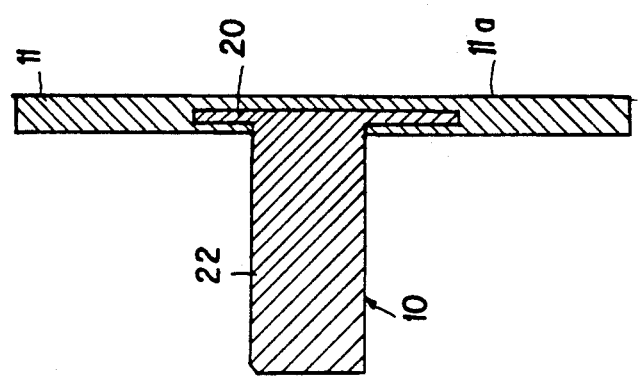

DIAPHRAGM VALVE WITH MECHANICALLY LINKED DIAPHRAGM

FIELD OF THE INVENTION

The present invention relates to a diaphragm valve, such as for use in systems of the type disclosed in Farnsworth U.S. Pat. No. 4,773,446.

BACKGROUND OF THE INVENTION

It is desirable, particularly in clinical assay or analysis equipment, to have a diaphragm valve which can open without application of external forces, such as by vacuum assist. This is accomplished by pre-loading the diaphragm to an open position, then sealing the diaphragm with spring force on a plunger. However, manufacture of this type of valve is very difficult because of the tolerances which must be held to satisfy all field situations. For example, the valve may not open sufficiently quickly (within less than one second) because over a period of time there is a tendency for the polymer from which the diaphragm is formed to flow into a new configuration. With very tight tolerance specifications, new controlling software and careful assembly, this problem has been partially overcome, but the cold-flowing properties of the diaphragm material continue to present problems and has made production of a fully satisfactory product difficult. Although several types of diaphragm valves have been previously used, none of these valves can be used for a long period of time without the need for replacement.

One type of valve, known as the Porton valve, uses a pre-loaded formed or unformed diaphragm valve which moves away from the valve site when a plunger is retracted. Another construction known as the Grafunder design, involves movement of the diaphragm by vacuum away from the valve site when a plunger is retracted. Commercial products which use this technology are the Porton sequencer and Applied Biosystems analyzers.

The disadvantage of the Porton valve is its excessive cold-flow at the valve site if the valve is not used for long periods of time. The plunger retracts, but the diaphragm fails to open even though it is pre-loaded, because the pre-loaded force has been diminished by cold-flow. The disadvantage of the Grafunder design is the requirement for complicated subsystems to provide a vacuum above the diaphragm, including a vacuum source, a sealed plunger design, and generally more complexity in the valve arrangement. Additionally, if these diaphragms are made of an inert flexible material such as Kalrez, they will still coldflow and fail to open. If Teflon is used for the valve, the Teflon will be very thin and will crack if moved often.

In order to overcome these problems, attempts had been made to glue the inert material to the end of a plunger. However, this approach was not successful in making a valve that seals completely and also withstands many actuations in the valve. Also, a number of other workers have attempted to provide diaphragm valves, but none of these has been entirely successful.

Thus, Rogers et al., in U.S. Pat. No. 2,324,880, discloses a valve diaphragm wherein the diaphragm is positively attached to a diaphragm actuator by a stud the head of which is embedded in the diaphragm body and surrounding the shank of a stud. An essential metallic ring prevents the elastic material between the shaft and the ring from stretching, thereby preventing the stud from being torn out of the diaphragm. The ring has a diameter roughly equal to that of the head of the stud. In this valve design, the ring is a critical element to prevent stretching of the diaphragm material, and the intent is to prevent the stud from being pulled away from the diaphragm. The valve disclosed is made of a material that can be rendered semi-plastic by the fluid which is being controlled by the valve.

Hughes, in U.S. Pat. No. 2,675,758, discloses a chemical feeder containing a diaphragm pump which provides pressure strokes by the uniform application of fluid under pressure over one face of the diaphragm. A machine screw is embedded in an enlarged central portion of the diaphragm and extends into a spring chamber. The diaphragm may be returned on suction strokes, upon release of the pressure, by its own resiliency or by means of a spring. When pumping under low head, the spring is not necessary, and the suction strokes can be accomplished solely by the resiliency of the diaphragm. There is no indication that the material of which the diaphragm is made can creep, only that the diaphragm is made of a flexible material such as neoprene.

McFarland, in U.S. Pat. No. 3,011,758, discloses valve diaphragms made of relatively stiff, inflexible material. All of the valves disclosed herein have various patterns of crests and hollows that act as bellows and provide gradual flexure which prevents localized and concentrated stresses which would develop cracks in the diaphragm.

Janquart, in U.S. Pat. No. 3,034,761, discloses an anti-caking dispenser valve. In this device, an annular, flexible diaphragm is in the form of a flange integrated with a shank to prevent incrustation around a movable armature. The diaphragm has a beaded portion at its outer periphery which is arranged to be received within an annular channel. A second laterally extending flange formed integrally with the shank and having a depending ring is arranged to seat against the lower surface of an outlet chamber, the depending ring arranged to provide a fluid tight seal at the outlet from the valve body. Two flanges are provided which are designed to break away incrustations of solidified fluid.

Saunders, in British Patent No. 434,665, discloses a diaphragm valve having flexible reinforcing means embedded in the diaphragm material to prevent the stud form being pulled through the diaphragm material. The reinforcing material is used to prevent possible creep of the diaphragm material.

Fulton et al., in U.S. Pat. Nos. 4,734,190 and 4,810,392, disclose valves made of Kalrez. These valves are merely seals located at the end of a piston. The seals are of a dimension so as to rub against the piston cylinder and prevent intermixing of liquids.

SUMMARY OF THE INVENTION

It is an object of the present invention to overcome deficiencies in the prior art such as those indicated above.

It is another object of the invention to provide a diaphragm valve that does not creep when not used for long periods of time.

According to the present invention, a diaphragm valve is made using a solenoid with a plunger. The diaphragm is permanently attached to one end of a retractor by molding the diaphragm material onto and around a thin flat surface of the retractor which is roughly the same dimension as the valve site on the surface of a valve block. The diaphragm material is held in place on the retractor by purely mechanical means, such as by interlocking due to flow of the material during molding around the flat surface of the retractor. The retractor may have holes therethrough to further promote a good mechanical interlocking of the diaphragm material to the retractor. The opposite end of the retractor is adopted to be received by the solenoid plunger, for example, by threading. The surface of the plunger which touches the diaphragm/retractor is formed in a way which allows the diaphragm to remain flat and undistorted. Screwing the diaphragm/retractor into the plunger results in a mechanically stable assembly which will not come apart on repeated operations. Also, the flat end of the retractor which is embedded into the diaphragm material acts to stabilize the cold-flowing tendencies of the inert material or elastomer from which the diaphragm is formed rubber so that this flow is limited and the material at the valve site is stable for long periods.

In practice, the retractor can be made from a stainless steel 2-56 screw which has had the screw head machined flat and to 0.01 inch thick. The inert diaphragm material is molded around this flat end to provide for example a thickness of 0.03 inch and the threaded end is used to attach the assembly to the solenoid plunger.

BRIEF DESCRIPTION OF THE DRAWINGS

FIG. 1 is a sectional view of the diaphragm valve according to the present invention, taken along line 1—1 of FIG. 2

FIG. 2 is a rear-end view of the diaphragm valve according to the present invention.

DETAILED DESCRIPTION OF THE DRAWINGS

Figure 5:
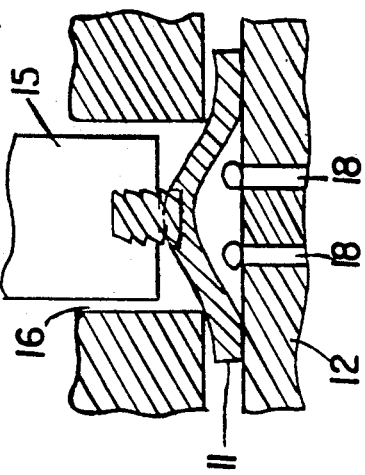
FIG. 5 is a sectional view of another embodiment of the diaphragm valve of the present invention in closed position.
Figure 6:
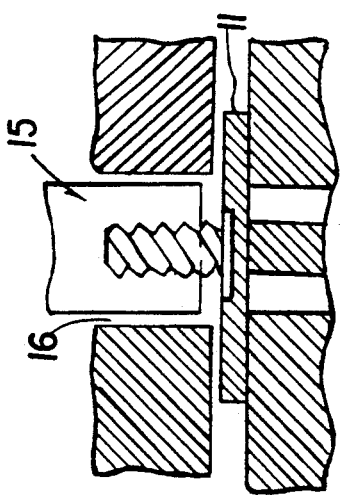
FIG. 6 is a sectional view of the diaphragm valve as shown in FIG. 5 showing the valve in open position.

FIG. 1 shows a valve according to the present invention having a retractor 10 integral with an elastomeric diaphragm 11. The retractor 10 has a thin head portion 20 and a stem portion 22 which may be threaded for connection to a plunger 13 (FIGS. 3 and 4) or 15 (FIGS. 5 and 6). The diaphragm 11 has a flat sealing base 11a.

In FIG. 2, one can see the stem 22 of the retractor 10 and the head portion 20 in phantom which is encapsulated within the diaphragm 11.

In the valves of the present invention, the diaphragm is made of a flexible, chemically inert material such as Kalrez or Chem-Raz. Selection of a proper elastomer or sufficiently flexible plastic for the diaphragm 11 is relatively important. The material from which the diaphragm 11 is formed must meet a variety of requirements including flexibility or elasticity, resistance to fatigue, inertness, resistance to chemical attack, thermal stability, moldability and resistance to creep or flow. One elastomeric material which meets all the requirements except for resistance to creep or flow when used in the conventional way, as noted above is Kalrez (TM of du Pont), which is a perfluorelastomer based on the copolymer [CA Registry No. 39613-22-4] of tetrafluoroethylene and perfluoromethyl vinyl ether [CA Registry No. 26425-79-6] plus a cure-site-active monomer. Its chemical resistance is similar to that of Teflon and it is considered the closest elastomeric analog to TFE. However, other materials may be used depending on the intended environment, including polypropylene, other perfluoroelastomerssuch as Chemraz, Fluorel and Viton, other arubbers such as silicone elastomers, etc.

Figure 3:
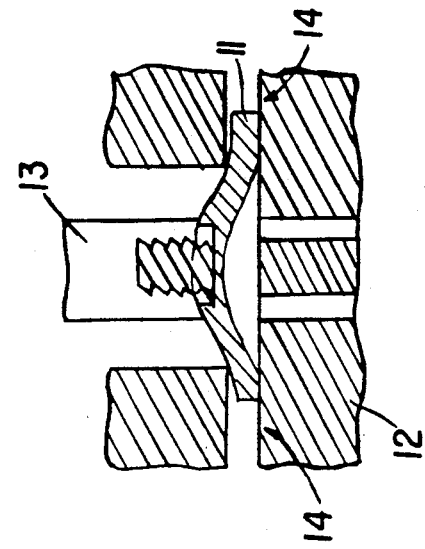
FIG. 3 is a sectional view of the diaphragm valve of the present invention in use in closed position.

In FIG. 3, the valve is shown in use with the retractor 10 integral with the diaphragm 11 inside the plunger 13 The diaphragm rests on the valve site (including inlet and outlet bores 18) on a block block.

Figure 4:
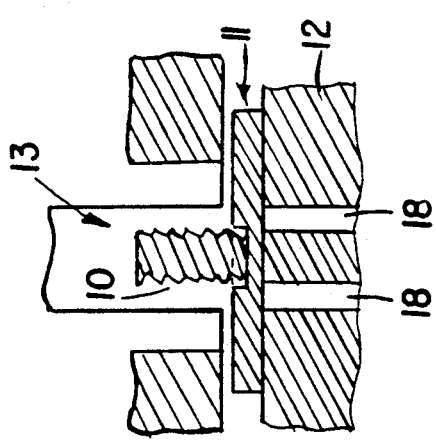
FIG. 4 is a sectional view of the diaphragm valve of the present invention showing the valve in an open position.

In FIG. 4, area 14 shows an area where liquid may not be effectively forced out when the valve closes.

In FIGS. 5 and 6, the diaphragm valve is shown wherein the plunger 15 has the same diameter as the guide hole 16. In this case, the diaphragm pulls away from the plunger but, when the valve is closed, all of the liquid around the valve site is forced out. The only difference between the embodiment shown in FIGS. 3 and 4 and the embodiment shown in FIGS. 5 and 6 is the diameter of the plunger. The larger diameter plunger helps to force out any remaining liquid left at the valve site.

In the valve according to the present invention, the inert material of the diaphragm 11 is mechanically attached to a plunger, which acts as a retractor for the diaphragm. The attachment is effected by molding the inert flexible or elastic material around a flat surface which is the same dimension as the valve site where the bores 18 emerge from the block 12. This prevents the material from cold-flowing, and also provides zero-dead-volume at the valve site.

To use the diaphragm valve according to the present invention, a solenoid with a plunger is used. The diaphragm is permanently attached to one end of a retractor by molding the material onto the thin flat surface 20 which is roughly the same dimension as the valve site on the surface of a valve block 12. The diaphragm material is held in place by purely mechanical means. The retractor 10 may have holes through it to promote further a good mechanical link of the diaphragm material to the retractor. The opposite end of the retractor is threaded or in some other way treated to be received by the solenoid plunger 15. The surface of the plunger which touches the diaphragm/retractor is formed in a way which allows the diaphragm to remain flat and undistorted. Screwing the diaphragm/retractor into the plunger results in a mechanically stable assembly which will not come apart on repeated operations. Also, the flat end of the retractor which is embedded in the diaphragm material acts to stabilize the cold-flowing tendencies of the elastomer so that this flow is limited and the material at the valve site is stable for long periods and repeated flexures.

For example, the retractor can be made from a stainless steel 2-56 screw which has had the screw head machined flat and 0.010 inch thick to an edge thickness of 0.030 inches. The inert rubbery material is formed around this flat end, and the threaded end is used to attach the assembly to the solenoid plunger.

In the diaphragm valve according to the present invention, the inert diaphragm material is mechanically attached to the plunger, which acts as the retractor for the diaphragm. The mechanical attachment is effected by molding the diaphragm material around a flat surface which is the same dimension as the valve site. This prevents the diaphragm material from cold-flowing and also provides zero dead volume at the valve site.

This valve of the present invention eliminates the necessity for vacuum-assisting the "on" actuation of the valve. Moreover, the present invention helps prevent excessive cold-flow of the diaphragm material at the critical valve site, even when the valve has not been in use for a long period of time. Additionally, the design of the valve according to the present invention provides zero-dead-volume operation because of the geometry of the valve block.

As noted above, the inert material used to form the diaphragm may be any relatively flexible and preferably elastomeric inert material such as Kalrez or Chemraz. Since these types of materials are more formable than Teflon, a flat surface may be used at the valve site so that zero-dead volume is attained. The retractor piece prevents the excessive cold-flow of the rubber so as to provide a very stable dimension at the valve site.

The diaphragm is attached so that it may be removed and/or adjusted for throw. The insert is threaded on the plunger end.

Extended life-testing has shown the diaphragm valves of the present invention are stable to over one million operations at approximately 0.010 inches throw. Extended periods of non-use do not affect the opening time or operation of the valves of the present invention. The cold-flow is well controlled, with minimal if any undesirable flow in use.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is

1. A diaphragm valve for the use in a conjunction with a valve site, comprising a retractor and a solenoid plunger, said retractor having a first end and a second end, said first end comprising a flat disc of preselected area sufficiently large to cover the valve site said valve site comprising an essentially flat surface, a flexible diaphragm molded onto the first end of said retractor said diaphragm being composed of a flexible, chemically inert material, the second end of said retractor being formed so as to be received by said solenoid plunger, said plunger having a first end and a second end, said first end being formed so as to receive said retractor and being of substantially the same diameter as said flat disc on said first end of said retractor, the second end of said plunger being of a diameter which may be received by the solenoid.

2. The diaphragm valve according to claim 1, wherein said retractor is provided with a plurality of holes therethrough.

3. The diaphragm valve according to claim 1, wherein said second end is threaded and said solenoid plunger is threaded.

4. The diaphragm valve according to claim 1 wherein said diaphragm is made of an elastomeric material.

5. The diaphragm valve according to claim 1 wherein said plunger is approximately the same diameter as a guide hole through which the plunger moves during opening and closing of the valve.

6. The diaphragm valve according to claim 1 wherein the diaphragm is made of a copolymer of tetrafluoroethylene and perfluoromethyl vinyl ether.

7. The diaphragm valve for use in conjunction with a valve site comprising a retractor and a solenoid plunger, said retractor having a first end and a second end, said first end comprising a flat disc of preselected area which is sufficiently large to cover the valve site, said valve site comprising an essentially flat surface, a flexible diaphragm molded onto the first end of said retractor, said diaphragm being composed of a flexible, chemically inert material, the second end of said retractor being formed so as to be received by said solenoid plunger, said plunger having a first end and a second end, said first end being formed so as to receive said retractor and being substantially the same diameter as said flat disc on said first end of said retractor, the second end of said plunger being of substantially the same diameter as an opening through which the plunger is received by the solenoid.

* * * * *